(No Model.)
H. M. WHITTAKER.
TREE BOX.
No. 414,175. Patented Oct. 29, 1889.
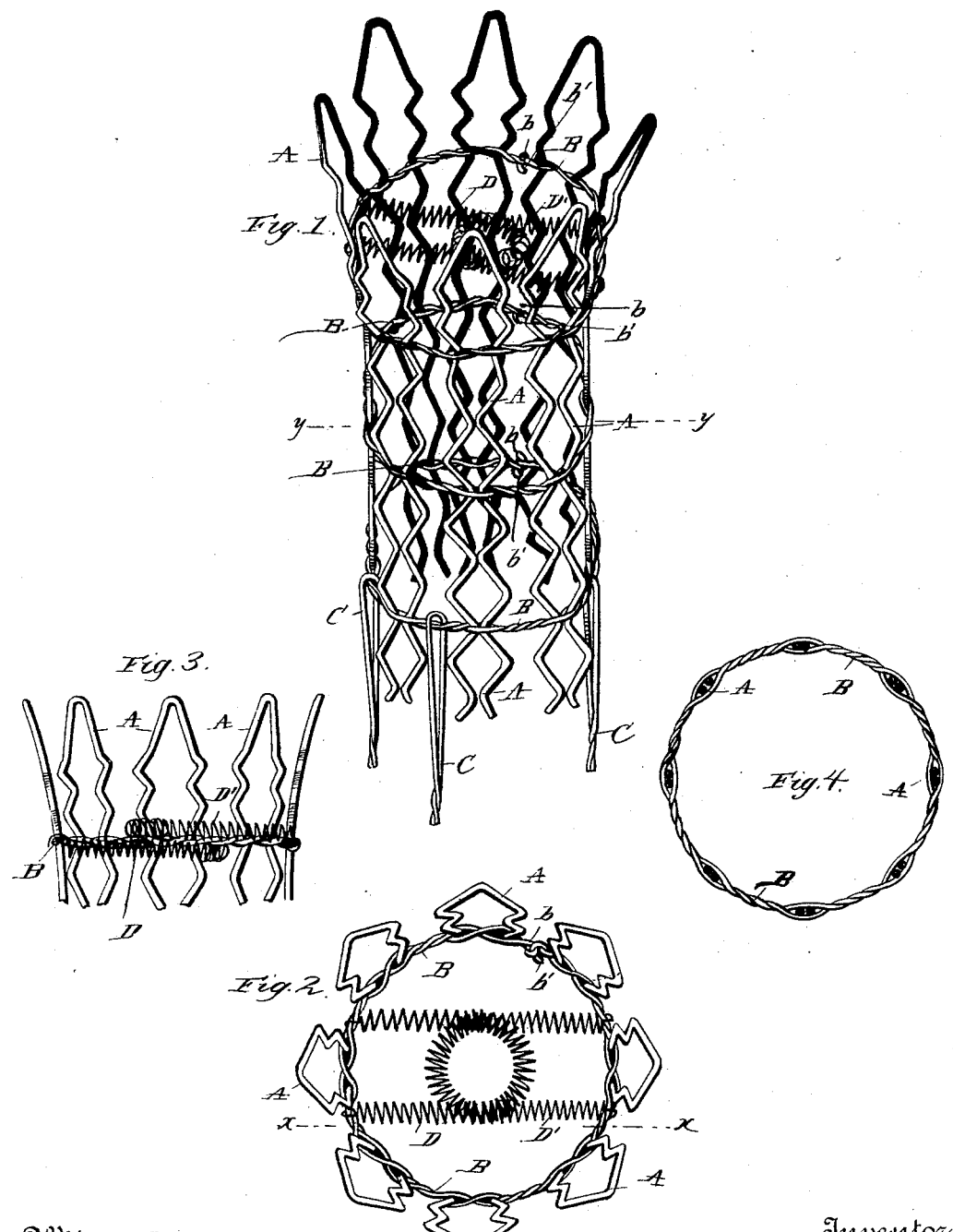
Witnesses
Inventor
Harry Marshal Whittaker
By his Attorneys

UNITED STATES PATENT OFFICE.

HARRY MARSHAL WHITTAKER, OF BEAVER FALLS, PENNSYLVANIA, ASSIGNOR OF TWO-THIRDS TO EDWARD F. SHELLABERGER, OF SAME PLACE.

TREE-BOX.

SPECIFICATION forming part of Letters Patent No. 414,175, dated October 29, 1889.

Application filed June 11, 1889. Serial No. 313,925. (No model.)

*To all whom it may concern:*

Be it known that I, HARRY MARSHAL WHITTAKER, a citizen of the United States, residing at Beaver Falls, in the county of Beaver and State of Pennsylvania, have invented certain new and useful Improvements in Tree-Boxes; and I do declare the following to be a full, clear, and exact description of the invention, such as will enable others skilled in the art to which it appertains to make and use the same, reference being had to the accompanying drawings, and to the letters or figures of reference marked thereon, which form a part of this specification.

This invention relates to tree-boxes, and has for its object to provide a box that will be light and ornamental and which will adapt itself to the growth of the tree, and which will readily adapt itself to the movements of the tree, thereby preventing injury to the latter.

The improvement consists in a box composed of vertical pickets and encircling cables, the latter having their ends bent so as to be readily fastened together, slotted anchoring-pins, and elastic loop-holders. The pickets are held at a fixed relative distance apart, and their connection with the cables is sufficiently loose so that the box is capable of giving in any direction to adapt itself to the swaying of the tree.

The improvement further consists in the novel features and the peculiar construction and combination of the parts, which will be hereinafter more fully described and claimed, and which are shown in the annexed drawings, in which—

Figure 1 is a perspective view of a tree-box embodying my invention. Fig. 2 is a top plan view of the box. Fig. 3 is a vertical section of the upper part of the tree-box on the line $x$ $x$ of Fig. 2. Fig. 4 is a horizontal section on the line $y$ $y$ of Fig. 1.

The box comprises the vertical pickets A and the encircling cables B, which are twisted about contracted parts of the pickets so that the cables cannot move on the pickets. The joints between the pickets and the cables are sufficiently loose to permit the yielding of the box in any direction, as when the tree is swayed by the wind, so that the tree will not knock against the box and be bruised. The cables B will have hooks $b$ and $b'$ at their ends, whereby they can be fastened together. One hook, as $b$, can be closed, the other hook $b'$ being closed after it is engaged with the hook $b$ when the box is placed around a tree. The anchoring-pins C are slotted and straddle the lowest cable, and are driven into the ground to secure the box in place, and are formed, preferably, from a stout piece of wire, which doubles on itself and has its ends twisted together. The elastic loop-keepers D and D' have their ends secured to the box, the tree being held in the bight of each. They are preferably coil-springs, which have their ends bent and engaged with the box.

To place the box around a tree, the ends of the cables are separated to permit the entrance of the tree in the box. Then the ends of the cables are fastened by the hooks $b$ and $b'$. The pins C are driven into the ground, and one end of each keeper D and D' is loosened and the keepers passed around the tree in opposite directions, and the ends previously loosened are fastened.

Having thus described my invention, what I claim, and desire to secure by Letters Patent, is—

1. The hereinbefore-described tree-box, comprising the vertical pickets, the encircling cables having their strands loosely twisted about the said pickets, and having hooks at their ends by which to fasten the cables together, the slotted anchoring-pins having the lowest cable passing through the slot in each pin, and the elastic loop-keepers D and D' for embracing the tree on opposite sides and expanding with the growth of the tree, substantially as set forth.

2. The combination, with the tree-box, of the slotted anchoring-pins having a portion of the box passing through the slot in each pin, whereby the box can be fastened to the ground and will be free to sway with the tree without doing injury thereto, substantially as described.

In testimony whereof I affix my signature in presence of two witnesses.

HARRY MARSHAL WHITTAKER.

Witnesses:
J. F. MERRIMAN,
E. E. WHITTAKER.